United States Patent
Pietron et al.

(10) Patent No.: US 9,512,889 B2
(45) Date of Patent: Dec. 6, 2016

(54) CONTROL OF A TRANSMISSION FRICTION ELEMENT USING AN ADAPTIVE TRANSFER FUNCTION

(71) Applicant: FORD GLOBAL TECHNOLOGIES, LLC, Dearborn, MI (US)

(72) Inventors: Gregory M. Pietron, Canton, MI (US); Diana Yanakiev, Birmingham, MI (US); Yuji Fujii, Ann Arbor, MI (US); Joseph F. Kucharski, Livonia, MI (US); Nimrod Kapas, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 402 days.

(21) Appl. No.: 13/873,423

(22) Filed: Apr. 30, 2013

(65) Prior Publication Data

US 2014/0324308 A1 Oct. 30, 2014

(51) Int. Cl.
F16D 48/06 (2006.01)

(52) U.S. Cl.
CPC ............. *F16D 48/06* (2013.01); *F16D 48/066* (2013.01); *F16D 2500/30803* (2013.01); *F16D 2500/7044* (2013.01); *F16D 2500/70252* (2013.01); *F16D 2500/70282* (2013.01); *F16D 2500/70605* (2013.01); *F16D 2500/70663* (2013.01); *F16D 2500/7101* (2013.01)

(58) Field of Classification Search
CPC .......... F16D 48/06; B60K 41/02; F16H 59/56; F16H 59/68

USPC ......... 701/67, 68, 75, 94, 95, 110; 192/3.58, 192/54.1, 70.16, 70.17, 103 F; 477/70, 83, 477/171, 174, 180, 181; 123/197.5, 123/339.16–339.21

See application file for complete search history.

(56) References Cited

U.S. PATENT DOCUMENTS

| | | | |
|---|---|---|---|
| 4,790,418 A * | 12/1988 | Brown et al. | 701/51 |
| 5,115,698 A * | 5/1992 | Leising et al. | 475/65 |
| 6,259,986 B1 | 7/2001 | Kotwicki | |
| 6,514,173 B2 * | 2/2003 | Suzuki | 477/124 |
| 6,676,561 B2 * | 1/2004 | Fritzer et al. | 477/70 |
| 6,770,010 B2 * | 8/2004 | Matsumura et al. | 477/124 |
| 6,902,511 B2 * | 6/2005 | Shimizu et al. | 477/4 |
| 7,212,935 B1 | 5/2007 | O'Brien et al. | |
| 8,255,130 B2 | 8/2012 | Fujii et al. | |
| 2002/0137595 A1 * | 9/2002 | Markyvech et al. | 477/77 |
| 2009/0118930 A1 * | 5/2009 | Heap et al. | 701/54 |
| 2010/0318269 A1 | 12/2010 | Yanakiev et al. | |
| 2012/0316738 A1 * | 12/2012 | Teslak et al. | 701/53 |

* cited by examiner

*Primary Examiner* — Jerrah Edwards
*Assistant Examiner* — Majdi Alsomiri
(74) *Attorney, Agent, or Firm* — James Dottavio; MacMillan, Sobanski & Todd, LLC

(57) ABSTRACT

A transmission clutch control method includes defining a transfer function relating clutch torque to a control signal under transmission operating conditions; determining a target clutch torque for current operating conditions; determining the target control signal from the transfer function to produce target torque at the clutch; correcting clutch torque on the basis of a difference between the target clutch torque and the actual torque at the clutch by adjusting the control signal; calculating actual clutch torque with reference to transmission input torque and transmission output torque; computing a clutch torque error as a difference between calculated clutch torque and the target clutch torque; and repetitively adjusting the transfer function on the basis of the clutch torque error.

20 Claims, 8 Drawing Sheets

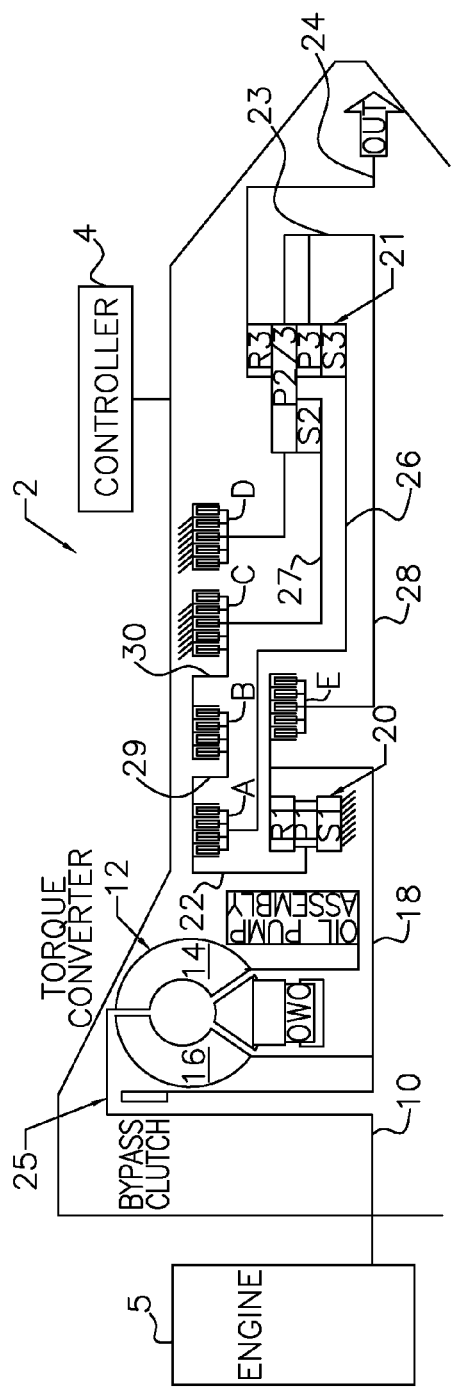

CONTROL OF A TRANSMISSION FRICTION ELEMENT USING AN ADAPTIVE TRANSFER FUNCTION

BACKGROUND OF THE INVENTION

1. Field of the Invention

This invention relates generally to a method for controlling a transmission clutch during a clutch control event.

2. Description of the Prior Art

A clutch transfer function is defined as a relationship between clutch torque transmitted through frictional interfaces and a clutch actuator control signal, which may be electric current to an electric clutch actuator, hydro-electric actuator pressure, clutch piston position or other variables.

Clutch torque is affected by various uncontrolled noise factors, such as actuator system variability and thermal sensitivity of hydrodynamic torque, during the clutch actuation process. For example, for a hydraulically-actuated wet clutch, clutch torque may be relatively linear with respect to a given control signal profile at a certain transmission fluid temperature. However, at a different transmission fluid temperature, clutch torque may exhibit significant nonlinearity and its value may be considerably different for the same given control signal.

The clutch transfer function varies from unit to unit due to hardware variability and also changes over the life of a vehicle due to degradation and wear of system components, including friction material, transmission fluid additives, hydraulic valves, etc. In practice, it is not easily possible to capture the changing transfer function behaviors in volume production applications using prior art technologies. Accordingly, a conventional clutch control methodology primarily relies on a clutch transfer function, which may be obtained a priori based on limited vehicle tests or bench tests.

The clutch transfer function may be adjusted based on indirect observations such as increased transmission shift duration. However, such an approach cannot directly and accurately map a detailed functional relationship between clutch torque and actuator control signal under all drive conditions.

SUMMARY OF THE INVENTION

A transmission clutch control method includes defining a transfer function relating clutch torque to a control signal under transmission operating conditions; determining a target clutch torque for current operating conditions; determining the control signal from the transfer function to produce target torque at the clutch; correcting clutch torque on the basis of a difference between the target clutch torque and the actual torque at the clutch by adjusting the control signal; calculating actual clutch torque with reference to transmission input torque and transmission output torque; computing a clutch torque error as a difference between calculated clutch torque and the target clutch torque; and repetitively adjusting the transfer function on the basis of the clutch torque error.

The clutch transfer function constructed through the method provides valuable tool for controlling clutch behaviors, collectively accounting for all the noise factors which are difficult to characterize individually. The method also provides a systematic means to account for unit-to-unit variability or a characteristics change over time. The transfer function can be utilized to back calculate the control signal required to achieve a desired clutch torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram of a gearing arrangement for an automatic transmission;

FIG. 2 is chart showing the engaged and disengaged state of each of the clutches and brakes of the transmission of FIG. 1 for each of the forward gears and reverse gear;

DESCRIPTION OF THE PREFERRED EMBODIMENT

Figure 3:
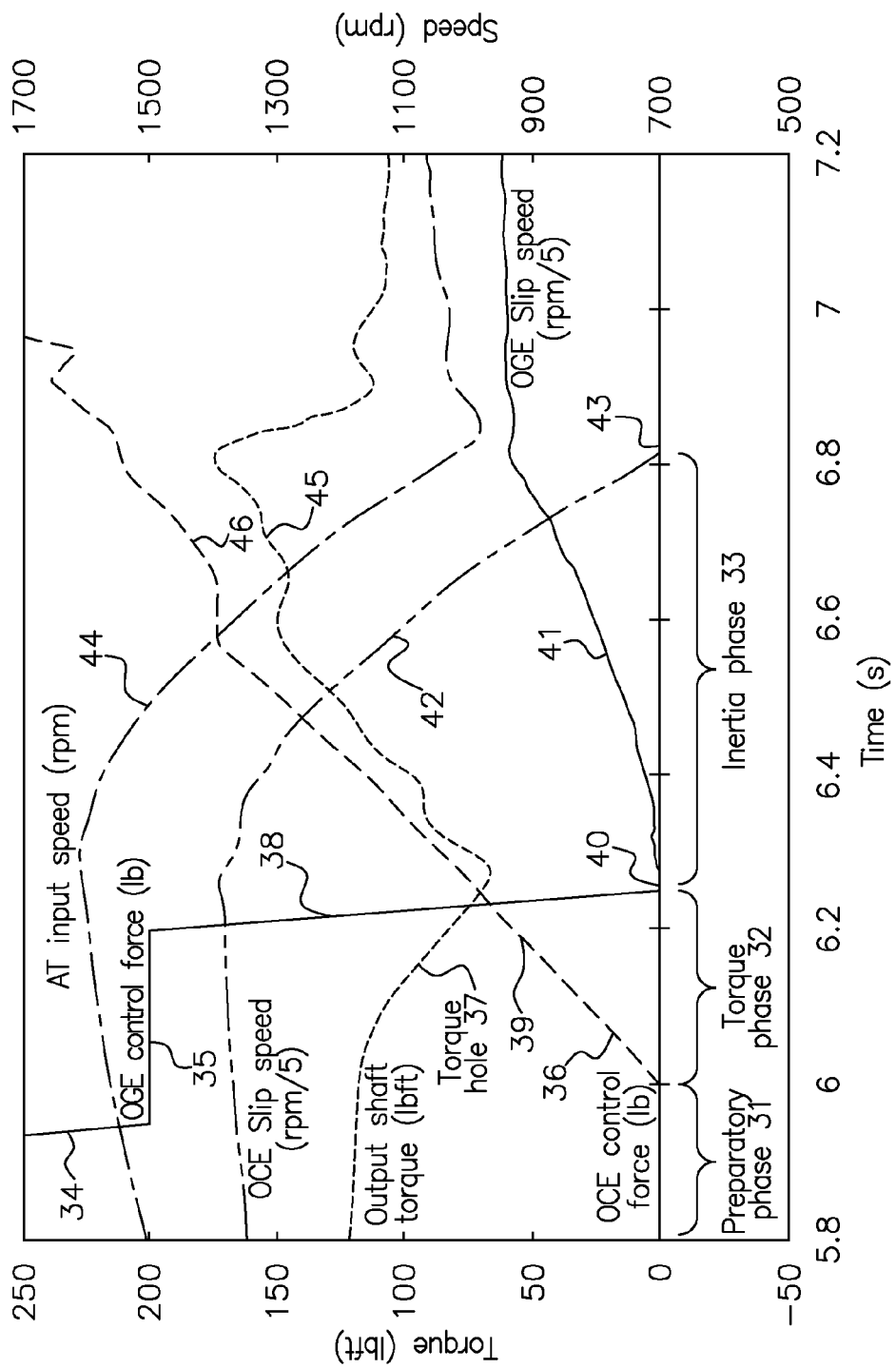
FIG. 3 is a graph of a general process of a synchronous friction element-to-friction element upshift event from a low gear to a higher gear for the transmission of FIG. 1.

Transmission 2 schematically illustrated in FIG. 1 is an example of a multiple-ratio transmission having a controller 4, wherein speed ratio changes are controlled by friction elements acting on individual gear elements. Engine torque from vehicle engine 5 is carried to torque input element 10 of hydrokinetic torque converter 12. An impeller 14 of torque converter 12 develops turbine torque on a turbine 16. Turbine torque is transmitted on a turbine shaft, which is also transmission input shaft 18. Transmission 2 includes a simple planetary gearset 20 and a compound planetary gearset 21. Gearset 20 has a permanently fixed sun gear S1, a ring gear R1 and planetary pinions P1 rotatably supported on a carrier 22 and meshing with sun gear S1 and ring gear R1. Transmission input shaft 18 is drivably connected to ring gear R1.

Compound planetary gearset 21, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which mesh with short planetary pinions P3 and torque output ring gear R3. Short planetary pinions P3 further mesh with sun gear S3. Planetary pinions P2/3, P3 of gearset 21 are rotatably supported on compound carrier 23. Ring gear R3 is drivably connected to a torque output shaft 24, which is drivably connected to vehicle traction wheels through a differential and axle assembly (not shown).

Gearset 20 is an underdrive ratio gearset arranged in series with respect to compound gearset 21. Torque converter 12 preferably includes a lockup or torque converter bypass clutch 25, which directly connects transmission input shaft 18 to engine 5 after a torque converter torque multiplication mode is completed and a hydrokinetic coupling mode begins.

FIG. 2 is a chart showing a clutch and brake friction element engagement and release pattern for establishing each of six forward driving ratios and a single reverse ratio for transmission 2.

During operation in the first four forward driving ratios, carrier P1 is drivably connected to sun gear S3 through shaft 26 and forward clutch A. During operation in the third ratio, fifth ratio and reverse, direct clutch B drivably connects carrier 22 to shaft 27, which is connected to large pitch diameter sun gear S2. During operation in the fourth, fifth and sixth forward driving ratios, overdrive clutch E connects turbine shaft 18 to compound carrier 23 through shaft 28. Friction brake C acts as a torsion reaction brake for sun gear S2 during operation in the second and sixth forward driving ratios. During operation of the third forward driving ratio, direct friction brake B is applied together with forward friction clutch A. The elements of gearset 21 then are locked together to effect a direct driving connection between shaft 28 and output shaft 26.

Forward friction clutch A is connected through torque transfer element 29, torque transfer element 29 to direct friction clutch B during forward drive.

The torque output side of direct friction element B, during forward drive, is connected to shaft 27 through torque transfer element 30. Reverse drive is established by applying low-and-reverse brake D and friction clutch B concurrently.

For the purpose of illustrating one example of a synchronous ratio 1-2 upshift produced by transmission 2, it will be assumed that the upshift occurs between the first ratio and the second ratio. During such a 1-2 upshift, forward friction clutch A remains engaged, friction brake C starts in the disengaged state before the upshift and is engaged during the upshift, and low/reverse friction brake D starts in the engaged position before the upshift and is released during the upshift. Friction clutch B and overdrive friction clutch E remain disengaged throughout the upshift.

Friction brake C is referred to as the oncoming element, oncoming clutch or oncoming element (OCE) during the synchronous 1-2 upshift. Friction brake D is referred to as the offgoing element, offgoing clutch or offgoing element (OGE).

FIG. 3 depicts a general process of a synchronous friction element-to-friction element upshift from a low gear to a higher gear for the automatic transmission of FIG. 1. For example, the process has been described in relation to a 1-2 synchronous ratio upshift wherein friction element C is an oncoming friction element and low/reverse friction element D is an off-going friction element, but it is not intended to illustrate a specific control scheme.

The upshift event is divided into three phases: a preparatory phase 31, a torque phase 32 and an inertia phase 33. During preparatory phase 31, an on-coming friction element piston is stroked (not shown) to prepare for its engagement. At the same time, off-going friction element control force is reduced as shown at 34 as a step toward its release. In this example, off-going friction element D still retains enough torque capacity shown at 35 to keep it from slipping, maintaining transmission 2 in the low gear configuration. However, increasing on-coming friction element control force shown at 36 reduces net torque flow within gearset 21.

Thus, the output shaft torque drops significantly during torque phase 32, creating a so-called torque hole 37. A large torque hole can be perceived by a vehicle occupant as an unpleasant shift shock. Toward the end of torque phase 32, off-going friction element control force is dropped to zero as shown at 38 while on-coming friction element apply force continues to rise as shown at 39.

Torque phase 32 ends and inertia phase 33 begins when off-going friction element D starts slipping as shown at 40. During inertia phase 33, off-going friction element slip speed rises as shown at 41 while on-coming friction element slip speed decreases as shown at 42 toward zero at 43. The engine speed and transmission input speed 44 drop as the planetary gear configuration changes. During inertia phase 33, output shaft torque indicated by profile 45 is primarily affected by on-coming friction element C torque capacity indirectly indicated by force profile 46. When oncoming friction element C completes engagement or when its slip speed becomes zero at 43, inertia phase 33 ends, completing the shift event.

Figure 4:
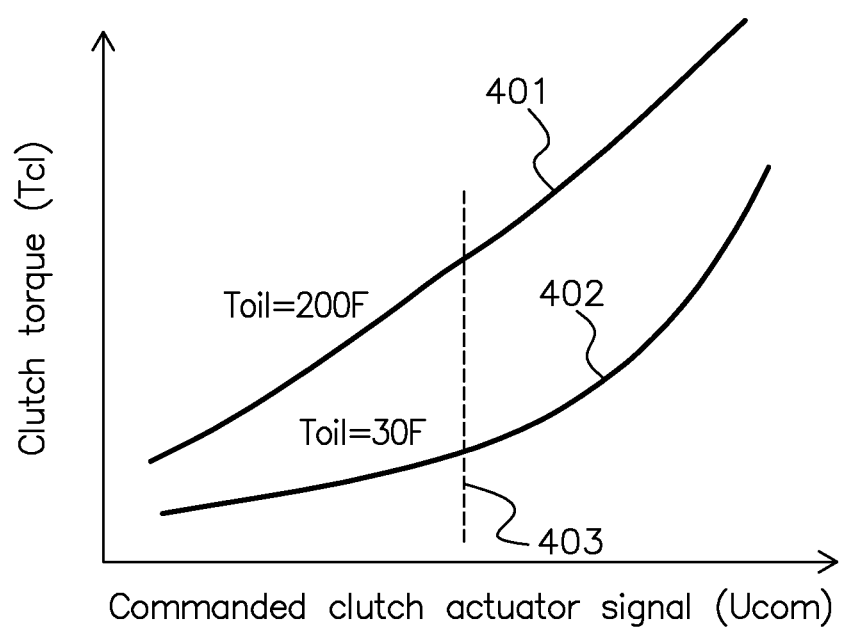
FIG. 4 is an example of clutch behaviors as a function of transmission oil temperature.

A clutch transfer function is defined as a relationship between clutch toque (Tcl), transmitted through frictional interfaces and a clutch actuator control signal (Ucom), which may be electric current to an electric clutch actuator, hydro-electric actuator pressure, clutch piston position or other variables. Clutch torque is affected by various uncontrolled noise factors, such as actuator system variability and thermal sensitivity of hydrodynamic torque, during the clutch actuation process. For example, for a hydraulically-actuated wet clutch system illustrated in FIG. 4, clutch torque Tcl may be relatively linear with respect to a control signal Ucom at Toil=200° F. 401, where Ucom may be a commanded pressure of hydraulic transmission fluid. However, at 30° F., clutch torque may exhibit significant non-linearity 402 and its value may be considerably lower at a given commanded signal level 403. The clutch transfer function or the relationship between Tcl and Ucom may vary from unit to unit and also change over the life of a vehicular system due to the degradation and wear of system components, including friction material, transmission fluid additives, hydraulic valves, etc. In practice, it is not easily possible to capture the changing transfer function behaviors in volume production applications using prior art technologies. Accordingly, a conventional clutch control methodology primarily relies on a clutch transfer function, which may be obtained a priori based on limited vehicle tests or bench tests. Clutch transfer function may be adjusted based on indirect observations such as increased transmission shift duration. However, such an approach cannot accurately map a detailed functional relationship between Tcl and Ucom under all drive conditions.

A clutch system, which includes an actuator and frictional elements, exhibits widely varying behaviors under different operating conditions. In the case of a hydraulic actuator system, its performance is very sensitive to hydraulic fluid conditions inside the hydraulic circuits. A wet clutch pack whose frictional interface is lubricated with transmission fluid also exhibits sensitivity to a number of factors such as slip velocity, fluid additives, oil temperature, etc. In the case of a dry clutch system, it is known that its frictional torque is sensitive to interface temperature conditions. Accordingly, even if the same actuator force profile is commanded, torque transmitted through frictional interfaces may differ significantly. Clutch torque variability generally degrades transmission output torque consistency or shift quality during a shift event.

Figure 5:
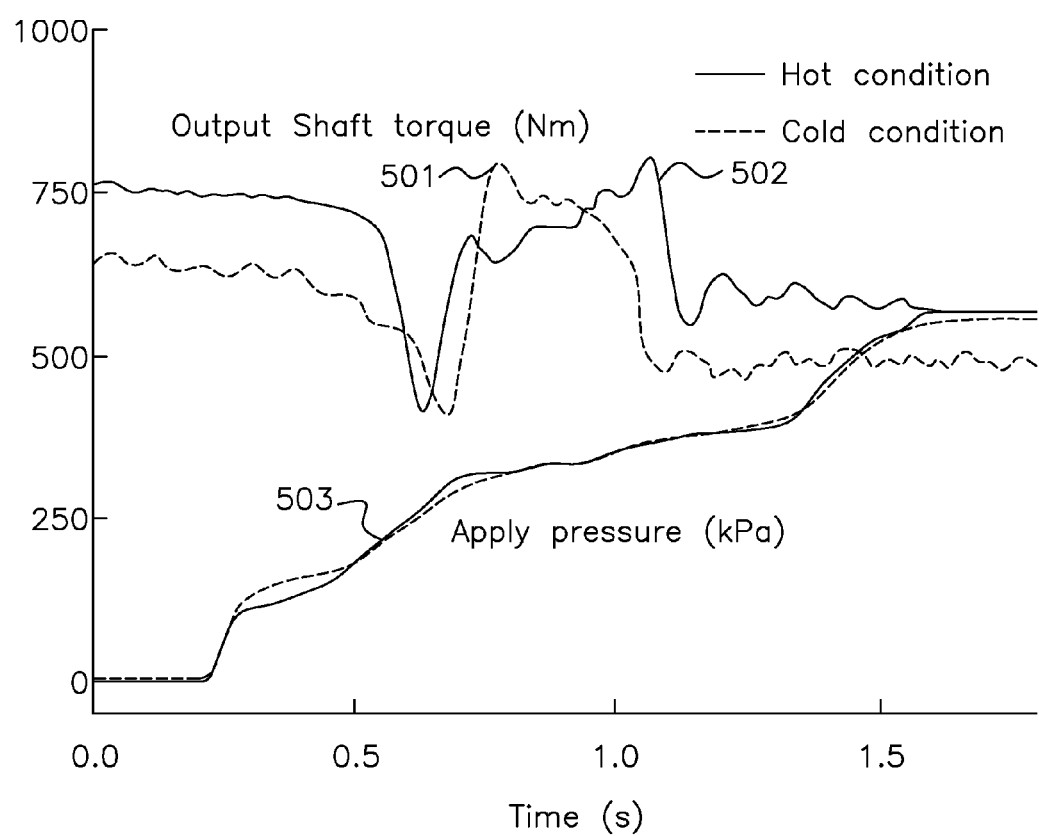
FIG. 5 is a graph illustration of varying shift behaviors under different operating conditions.

For example, FIG. 5 shows varying output shaft torque behaviors under two temperature conditions, resulting in inconsistent shift feel that may be negatively perceived by vehicle occupants. The transmission output shaft torque has a pronounced peak 501 at the beginning of the shift at cold temperature while the peak moves toward the end 502 at high temperature, even though the commanded pressure profiles are nearly identical 503. The performance of the clutch actuator and frictional components changes during the initial break-in phase and over time due to component wear, affecting shift quality. The behaviors of the clutch system also vary from unit to unit due to manufacturing and assembly variability. There is a need to accurately characterize a clutch transfer function or a relationship between a commanded control signal and actual torque transmitted across clutch hardware in order to accurately control clutch torque for improved shift quality, throughout the life of a transmission system.

Figure 6:
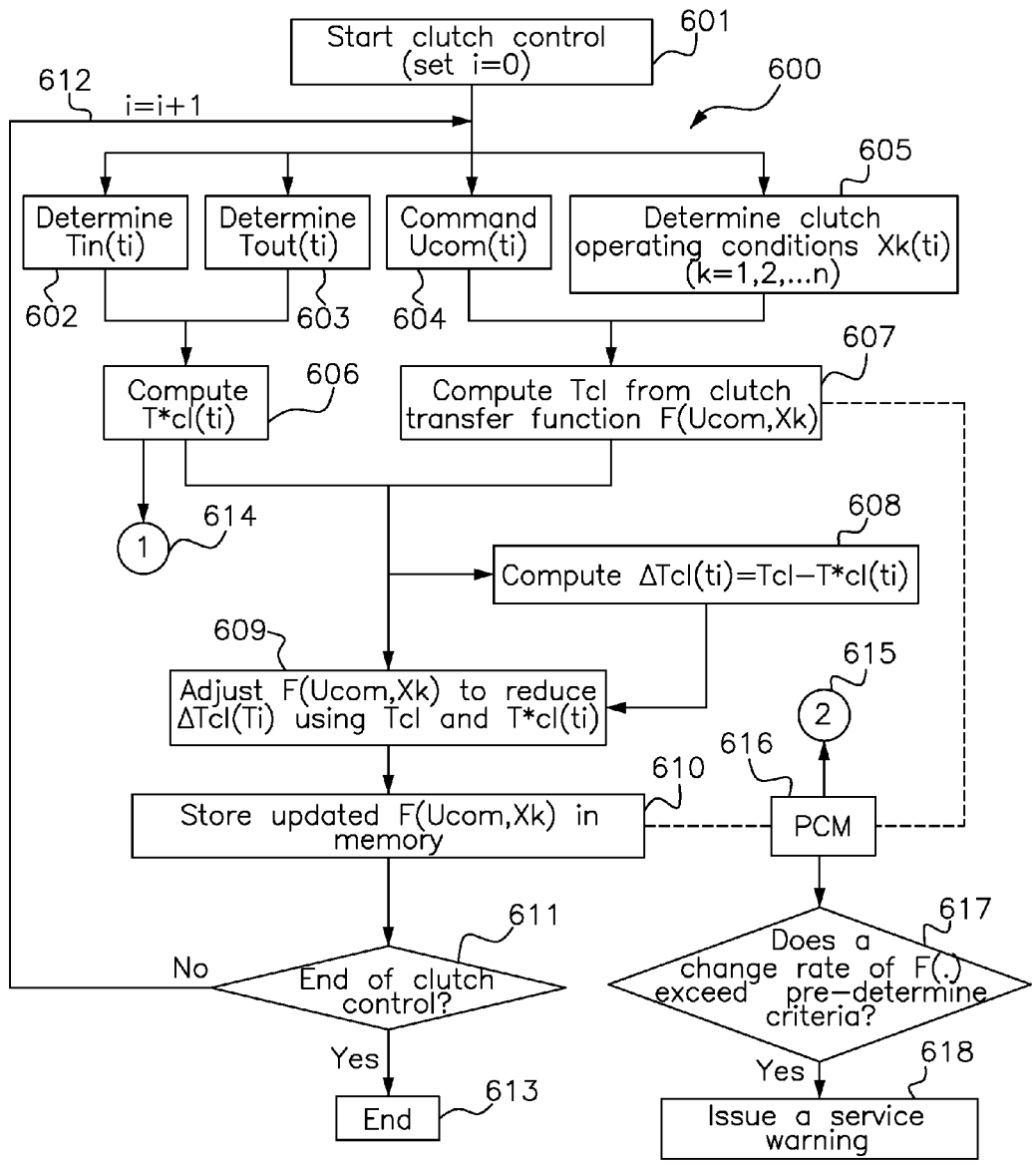
FIG. 6 is logic flow diagram of a method for constructing a transmission friction element transfer function.

FIG. 6 illustrates is a logic flow diagram 600 of a method for constructing and adaptively improving clutch transfer function. Clutch control starts at step 601. Torque transmitted on transmission input shaft 18 and output shaft 24 is preferably determined at steps 602 and 603 according to the methods described in U.S. Patent Application Publication No. U.S. 2010/0318269 at paragraphs [0050] through [0058] using driveline torque sensing or other means. The entire disclosure of U.S. Publication No. 2010/0318269 is incorporated herein by reference.

At step 606 clutch torque T*cl of either the oncoming friction control element or offgoing friction control element is determined based on Tin and Tout according to the methodology described with reference to Eq. (3) and Eq. (6) of U.S. Patent Publication No. U.S. 2010/0318269, respectively.

A clutch transfer function $F(\cdot)$ is defined in a functional form as Tcl=F(Ucom, Xk), wherein Ucom is a commanded clutch actuator control signal determined at step 604, and Xk, determined at step 605, are the corresponding transmission operating conditions.

$F(\cdot)$ may be defined using any suitable base function, such as a multi-variable polynomial with multiple coefficients or a neural network. Alternatively, $F(\cdot)$ may be defined as a look-up table with multiple dimensions for Xk, representing key operating conditions such as transmission oil temperature. $F(\cdot)$ is stored in a control system memory and utilized to compute Tcl under given operating conditions Xk at step 607.

At each time interval or time step (ti) during a clutch control event, the coefficients in $F(\cdot)$ or lookup table entries from which $F(\cdot)$ is determined are updated at step 609, based on T*cl, Tcl and ΔTcl, for a given Ucom and Xk. ΔTcl, is calculated at step 608. A conventional optimization method, such as a least square optimization method, may be employed for updating the coefficients of $F(\cdot)$ or the lookup table entries from which $F(\cdot)$ is determined. The optimization method reduces the magnitude of the difference ΔTcl between the clutch torque magnitude of T*cl computed from Tin and Tout at step 606 and the clutch torque magnitude computed from $F(\cdot)$ at step 607.

Each change to $F(\cdot)$ that occurs during successive executions of the control method 600 is stored in the control system memory at step 610.

A change or a change rate of the transfer function $F(\cdot)$ over time can be computed and stored in a powertrain control module (PCM) at step 616.

At step 617 a test is performed to determine whether the level of clutch system performance degradation is sufficient to warrant issuing at step 618 an early service warning before a system failure occurs.

At step 611 a test is performed to determine whether to end at step 613 execution of the clutch control.

Figure 7:
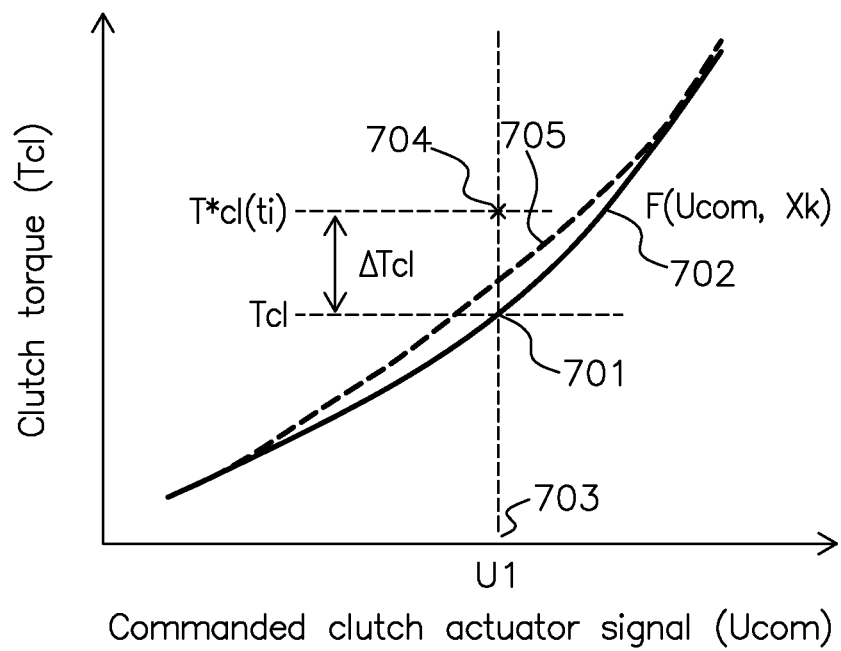
FIG. 7 illustrates with reference to a graph the method for updating the clutch transfer function.

FIG. 7 illustrates graphically the method described with reference to FIG. 6 for updating clutch transfer function. Under the given powertrain or transmission operating condition Xk, Tcl 701 is computed from the transfer function F(Ucom, Xk) 702 stored in PCM for the control signal Ucom=U1 703 at time step (ti). T*cl 704 is obtained from Tin and Tout, independently from the transfer function $F(\cdot)$ by employing the methodologies described in U.S. Publication No. 2010/0318269.

As shown in FIG. 7, T*cl(ti) 704 is larger than Tcl(U1, Xk) 701. Following the systematic methodology described with reference to FIG. 6, the coefficients of F(Ucom, Xk) are adjusted to move the function upward to 705, thereby reducing ΔTcl, based on Tcl and T*cl.

Figure 8:
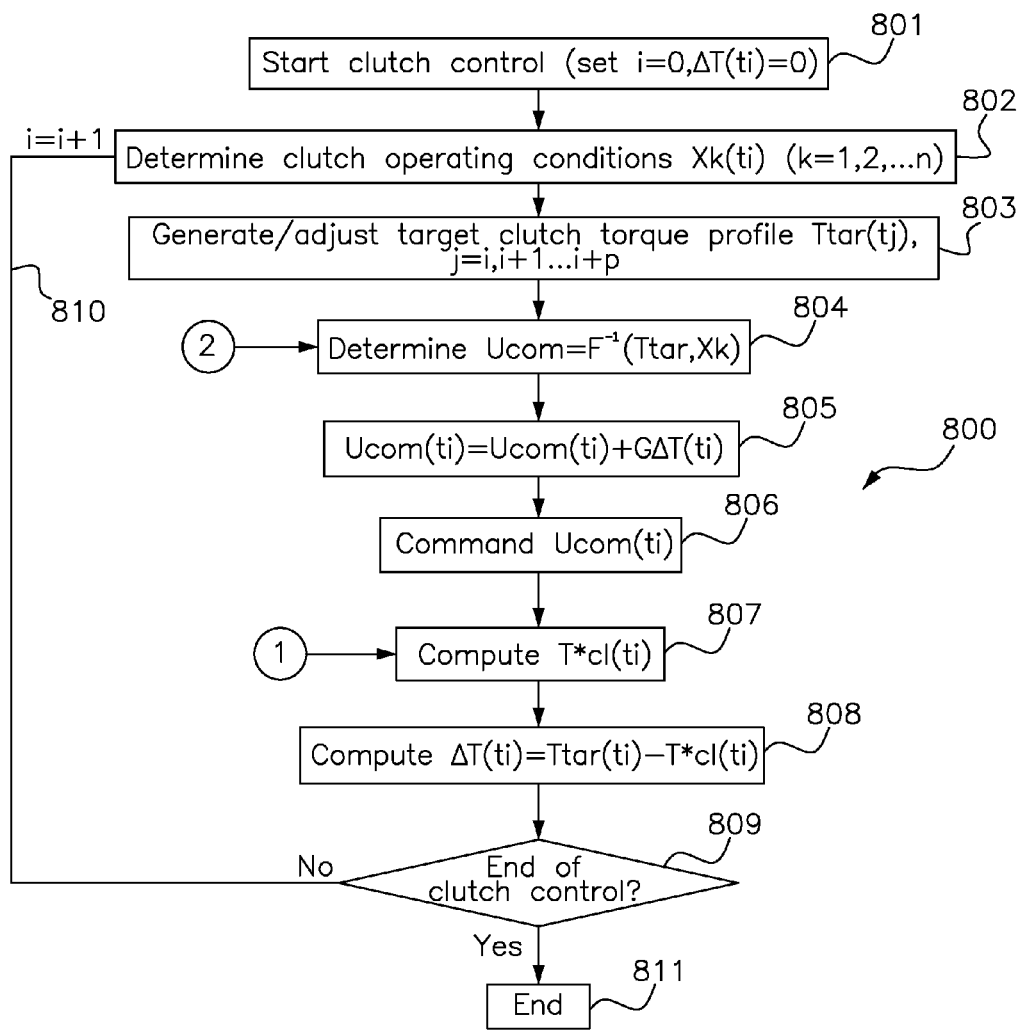
FIG. 8 is a logic flow diagram of a method for controlling a transmission clutch using the updated, adapted transfer function as described with reference to FIG. 6.

FIG. 8 is a logic flow diagram of a method for controlling a transmission clutch using the updated, adapted transfer function as described with reference to FIGS. 6 and 7. The clutch control event may include vehicle launch, transmission upshifting, downshifting or any other drivability control actions.

Clutch control starts at 801, where all the relevant powertrain and transmission variables are initialized.

At 802, clutch operating conditions Xk are determined based on measured data available in the transmission system 2.

At 803, a target clutch torque profile Ttar is determined for current clutch operating conditions Xk for a given drivability control event.

At step 804, based on the inverse of the clutch transfer function $F(\cdot)^{-1}$ stored at step 610, control signal profile Ucom is determined to realize the target magnitude of clutch torque Ttar for the current operating conditions Xk.

At step 805, Ttar is corrected based on ΔT as a feedback signal, where G is a control gain. Note that ΔT is set to 0 for i=0.

At step 806, Ucom is commanded for clutch control.

At step 807, T*cl is computed based on Tin and Tout.

At step 808, a clutch torque error ΔT is computed.

If end of clutch control is reached, then the control process ends at step 811.

If further clutch control is required, the iterative process 800 returns from step 809 to step 802 after incrementing (i) by 1 before re-executing step 802.

Figure 9:
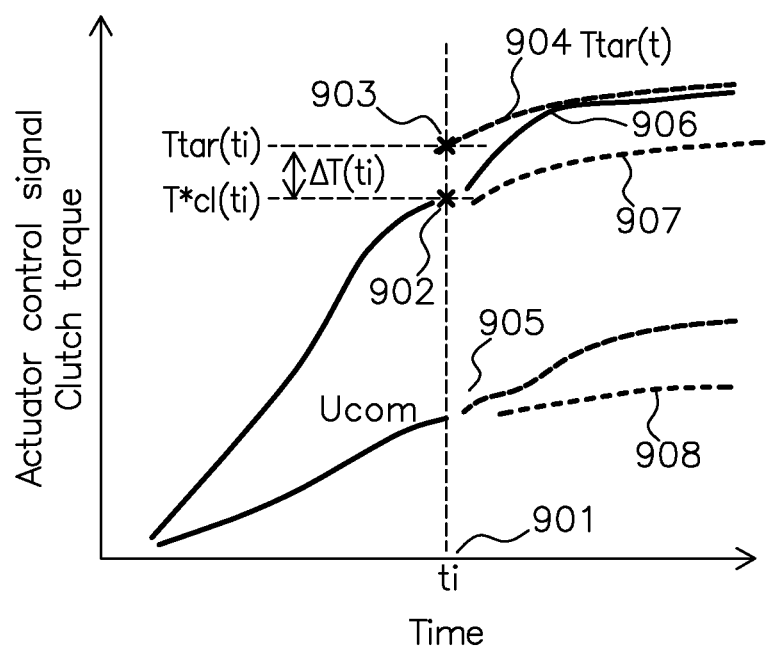
FIG. 9 is a graph that illustrates the variation of the control signal and clutch torque with time during a clutch event controlled according to the method.

FIG. 9 is a graph that illustrates the variation of the control signal and clutch torque with time during a clutch event controlled according to the method illustrated with reference to FIG. 8. At the first time step (ti) 901, actual clutch torque T*cl 902, which is determined from Tin and Tout, is lower than the target magnitude of clutch torque Ttar (ti) 903, which is a point on the target profile Ttar(t) 904. Ucom is corrected to a higher magnitude 905 for the time steps that follow ti, based on Ttar and ΔT and inverse clutch transfer function $F^{-1}$ to reduce ΔT.

The corrected Ucom 905 results in T*cl 906, which closely follows Ttar 904. In comparison, FIG. 9 illustrates T*cl 907, which differs significantly from Ttar 904 when neither clutch transfer function $F(\cdot)$ nor torque feedback ΔT is available to correct the control signal Ucom 908.

In accordance with the provisions of the patent statutes, the preferred embodiment has been described. However, it should be noted that the alternate embodiments can be practiced otherwise than as specifically illustrated and described.

The invention claimed is:

1. A method for controlling a transmission clutch during a clutch event, comprising:
   (a) defining a transfer function relating clutch torque to a control signal under transmission operating conditions;
   (b) determining a target clutch torque for current operating conditions;
   (c) using the control signal of the transfer function and the current operating conditions to produce torque at the clutch;
   (d) correcting clutch torque by adjusting the control signal based on a difference between the target clutch torque and the actual torque at the clutch;
   (e) calculating actual clutch torque with reference to transmission input torque and transmission output torque;
   (f) computing a clutch torque error as a difference between the calculated actual clutch torque and the target clutch torque;
   (g) repetitively adjusting the transfer function based on the clutch torque error.

2. The method of claim 1, wherein actual clutch torque is calculated in step (e) independently from the transfer function.

3. The method of claim 1, wherein clutch torque is calculated in step (e) based on one of sensing and estimating torque in a driveline of which the transmission is a component.

4. The method of claim 1, wherein the control signal is used to establish a torque transmitting capacity of the clutch.

5. The method of claim 1, wherein the transfer function is a multi-variable polynomial having multiple coefficients.

6. The method of claim 5, wherein the coefficients of the transfer function are updated using a least-squares optimization method.

7. The method of claim 1, wherein the transfer function is defined as a look-up table having multiple dimensions for the transmission operating conditions.

8. The method of claim 1, further comprising producing a warning signal if a rate of change of the transfer function exceeds a reference rate.

9. The method of claim 1, wherein the current operating conditions of step (b) are determined by sensing data obtained from a transmission for which the clutch is a component.

10. The method of claim 1, wherein the target clutch torque of step (b) is determined to produce a desired drivability behavior based on prior knowledge of vehicle behaviors.

11. A method for controlling a transmission clutch during a clutch event, comprising:
   (a) defining a transfer function relating clutch torque to a control signal for a range of transmission operating conditions including temperature of transmission fluid;
   (b) determining a target clutch torque for current operating conditions;
   (c) producing a target magnitude of pressure in the clutch by applying the control signal of the transfer function under the current operating conditions to an actuator of the clutch such that torque at the clutch is produced;
   (d) correcting clutch torque by adjusting the control signal based on a difference between the target clutch torque and the actual torque at the clutch;
   (e) calculating actual clutch torque with reference to transmission input torque and transmission output torque;
   (f) computing a clutch torque error as a difference between the calculated actual clutch torque and the target clutch torque; and
   (g) repetitively adjusting the transfer function on the basis of the clutch torque error.

12. The method of claim 11, wherein actual clutch torque is calculated in step (e) independently from the transfer function.

13. The method of claim 11, wherein clutch torque is calculated in step (e) based on one of sensing and estimating torque in a driveline of which the transmission is a component.

14. The method of claim 11, wherein the control signal is used to establish a torque transmitting capacity of the clutch.

15. The method of claim 11, wherein the transfer function is a multi-variable polynomial having multiple coefficients.

16. The method of claim 15, wherein the coefficients of the transfer function are updated using a least-squares optimization method.

17. The method of claim 11, wherein the transfer function is defined as a look-up table having multiple dimensions for the transmission operating conditions.

18. The method of claim 11, further comprising producing a warning signal if a rate of change of the transfer function exceeds a reference rate.

19. The method of claim 11, wherein the current operating conditions of step (b) are determined by sensing data obtained from a transmission for which the clutch is a component.

20. The method of claim 11, wherein the target clutch torque of step (b) is determined to produce a desired drivability behavior based on prior knowledge of vehicle behaviors.

* * * * *